(12) United States Patent
Romo

(10) Patent No.: US 10,564,671 B1
(45) Date of Patent: Feb. 18, 2020

(54) ELECTRONIC DEVICE MONITOR DOCKING APPARATUS

(71) Applicant: Romo Enterprises LLC, Clayton, MO (US)

(72) Inventor: Justin Ryan Romo, Clayton, MO (US)

(73) Assignee: ROMO ENTERPRISES LLC, Clayton, MO (US)

( * ) Notice: Subject to any disclaimer, the term of this patent is extended or adjusted under 35 U.S.C. 154(b) by 752 days.

(21) Appl. No.: 14/201,844

(22) Filed: Mar. 8, 2014

Related U.S. Application Data

(60) Provisional application No. 61/775,404, filed on Mar. 8, 2013.

(51) Int. Cl.
*G06F 3/06* (2006.01)
*G06F 1/16* (2006.01)

(52) U.S. Cl.
CPC .................................. *G06F 1/1632* (2013.01)

(58) Field of Classification Search
None
See application file for complete search history.

(56) References Cited

U.S. PATENT DOCUMENTS

| | | |
|---|---|---|
| 9,441,782 B2 * | 9/2016 | Funk ...................... F16M 13/02 |
| 2012/0083314 A1 | 4/2012 | Ng |
| 2012/0327581 A1 | 12/2012 | Pais |
| 2013/0194729 A1 | 8/2013 | Joe |
| 2013/0217442 A1 | 8/2013 | Djordjevic |
| 2013/0270002 A1 | 10/2013 | Fawcett |
| 2013/0279106 A1 * | 10/2013 | Ergun ................... G06F 1/1607 |
| | | 361/679.26 |

* cited by examiner

*Primary Examiner* — Scott C Sun
(74) *Attorney, Agent, or Firm* — Moazzam & Associates, LLC

(57) ABSTRACT

The invention provides an improved electronic device docking apparatus which is more convenient for the user and ergonomically placed about a monitor close to the standard viewing range of a user's workspace. The inventive device includes a ledge for accepting an electronic device and one or more features for mounting the improved electronic device docking apparatus to a monitor.

17 Claims, 6 Drawing Sheets

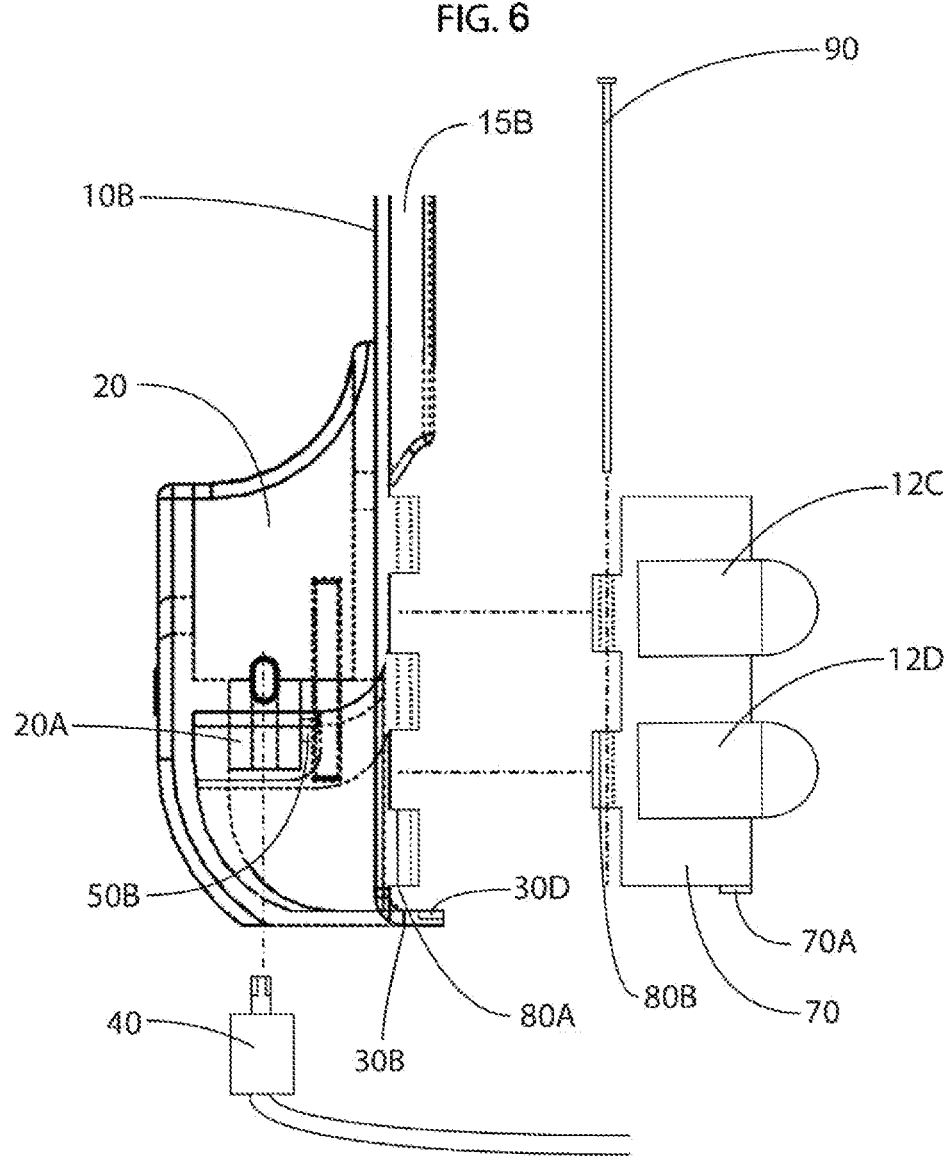

ELECTRONIC DEVICE MONITOR DOCKING APPARATUS

This U.S. Patent Application claims priority to U.S. Provisional Patent Application Ser. No. 61/775,404, filed Mar. 8, 2013, the content of which is hereby incorporated by reference herein in its entirety into this disclosure.

FIELD

The present disclosure is generally related to an electronic device docking system, and more particularly, to an electronic device charging and syncing system which mounts to a computer screen. By allowing the electronic device to be placed at an elevated position within the same general viewing region as the computer screens themselves helps to alleviate the need to physically move the head via the neck to view the electronic device which would otherwise be inconveniently located on the desk under the computer screens or off to the side away from the main viewing perspective of the user.

BACKGROUND

The statements in this section merely provide background information related to the present disclosure and may not constitute prior art.

Smart-phones represent a rapidly growing industry. Smart-phones are becoming ever more powerful and are taking a prominent position in our lives. As such, it is ideal to provide solutions which make these Smartphone devices ever more visible and accessible in those situations that we find ourselves in most often each day. When our personal and professional lives are so intertwined with a technology such as Smart-phones it is important for them to be easily accessible and in view when necessary.

Despite the proliferation of laptops and tablet computers, the creative professional still prefers a desktop computer due to its faster processor speeds and larger screen sizes; especially within an office or home office environment. Screen size is one reason why even those with laptops tend to dock said laptops into larger desktop screens which can range from 15" to 24" most commonly. Many office professions require the employee to be in front of a computer screen for numerous hours each day. From here on the term customer, user, worker, and employee will be used interchangeably and should be associated with any individual utilizing a desktop computing technology for work or play. For many, this is an average of 8 hours or more per day. Desktop screens are not the only devices we use to increase our productivity however, many of us also carry around Smart-phones. Smart-phones are another information and electronic data source which provides a quick and convenient look at 'To Do Items', 'Daily Tasks', 'Calendars', 'Stock Quotes', 'Visual video calls', 'emails', 'text messages' and hundreds of thousands of other uses thanks to the proliferation of online application stores. The focus and simplicity that Smart-phone's provide can now be more efficient than pc applications in some cases.

The interaction between the Smart-phone and the desktop computer has yet to evolve. To date these are two very much separate devices which coexist in their own right. There are data transmission and charging cables which exist along with wireless data connection means which invisibly merge these devices via software means, but there is a void in hardware systems designed to help merge these systems into one seamless experience. As mentioned, in many technical and knowledge based jobs, workers spend their time in cubicles, sometimes 8 or more hours per day. During this time workers focus on their task at hand located on the one or more computer monitors placed on the desks in front of them. Many organizations have opted for dual screen configurations due to the assumption that two monitors may equal twice the productivity output. It is reasonable to assume that adding additional screens may help increase productivity.

As Smart-phones become ever prominent, more and more of these workers have access to this other computation device, said Smart-phone, which helps increase productivity. Many companies are now investing in corporate Smart-phones for their employees for this very reason.

As a result workers often take time to look away from their main task at hand to interact with these Smart-phone devices. Every time a worker has to pause their task, and physically turn their head away from their main computer screens to interact with their Smart-phone, they lose a small amount of their prior task concentration. The reason for this loss of concentration is the fact that there is such a distance between their main task and their Smart-phone devices, which are often placed off to the side on the desk. Many workers may keep their Smart-phones in a horizontal position in front of them on the desk. The worker must look away from their main task and physically look down to interact with their Smart-phone. It is this physical motion of navigating the head via the neck muscles away from the task at hand that adds to the element of distraction; even if the goal is to interact with a tool that helps with productivity such as viewing a Smart-phone based calendar, to-do list, text message with a manager, a visual video call, checking an email etc.

There are products on the market which seek to position the Smart-phone at a more viewable angle on the desk. These products are often called "docks", or "docking stations". These docks are tangible objects which are designed with specific angles as to allow the Smart-phone to be propped or mounted into a semi-vertical position for easy eye viewing from the user.

These docking stations often come with an accompanied charging apparatus which consists of a connection means for temporarily joining said Smart-phones to a PC; a cord, and an AC adapter or USB plug that can be used to charge said Smart-phone or sync data information to another computational device such as a PC.

These docking stations come in a variety of shapes, designs, colors, materials, weights, sizes, and finishes. Some docking stations even feature speaker systems and clocks which serve to increase the utility of the docking system. However what the current docking stations all seem to have in common is that they are unnecessary external objects on the user's desk which only serve to clutter the desk space with additional objects and wires strewn across the desk or workspace. Many designers will agree that simplicity is the ultimate sophistication. Additional objects and cords do nothing to help improve concentration. In fact the more external objects within ones view during a productive exercise, the more the user may get distracted. This is a basic principle of minimalist design. Designers who believe in this philosophy seek to eliminate all unnecessary clutter and mess from ones viewing perspective to help create clarity in thought and thus clarity in execution. The invention outlined in the current disclosure seeks to do just this.

SUMMARY

The present disclosure is generally related to an electronic device charging system, and more particularly, to an electronic device charging and syncing system which mounts to a monitor. A monitor is defined as any visual display device used for displaying dynamic visual images and could include a desktop computer monitor, a laptop computer screen, a television or TV, a flat-screen visual device, LCD, Plasma, CRT, LED, OLED, or any other dynamic visual image technology known to those skilled in the art; these terms may be used interchangeably throughout the current disclosure. By allowing the electronic device to be placed at an elevated position within the same general viewing region as the computer screens, this helps to alleviate the need to physically move the head via the neck to view the electronic device which would otherwise be located on the desk under the computer screens or off to the side on the workspace or desk.

In one exemplary embodiment, an electronic device monitor docking apparatus includes a base assembly having a concave recess and/or ledge for accepting an electronic device. The said electronic device monitor docking apparatus having one or more features to mount said electronic device monitor docking apparatus to a monitor. Said electronic device monitor docking apparatus featuring a means to extend, in order to fit on a range of monitor sizes. Said electronic device monitor docking apparatus may accept or house speakers, clocks, or other electronic devices. Said base assembly featuring a concave cavity for which to accept a power and or data sync connector, and a concave recess to allow an audio cable connector to pass.

BRIEF DESCRIPTION OF THE DRAWINGS

The drawings described herein are for illustration purposes only and are not intended to limit the scope of the present disclosure in any way.

FIG. 6 illustrates an exploded and zoomed in side view of the bottom portion of a secondary embodiment of the electronic device monitor docking apparatus in accordance with another exemplary embodiment of the current disclosure.

DETAILED DESCRIPTION

The following description is merely exemplary in nature and is not intended to limit the present disclosure, application, or uses.

In reference to the drawings described herein, components serving similar functions, yet varying slightly with each embodiment description include the same numeral prefix and different alphabetical suffixes (e.g., A, B, C etc.).

When the numeral prefix is referred to alone, it is generally referring to all corresponding alphabetical suffix embodiments. Description of an alphabetical suffix embodiment may extend to the other corresponding embodiments listed behind the same numeral prefix when necessary. Specific embodiment components may be utilized by other embodiments. Similar alphabetical suffixes used for differing parts do not necessarily correspond to or relate to the same embodiment. Different alphabetical suffixes may be used for different components in a single embodiment.

It should generally be mentioned herein that when a specific component that contains multiple versions such as 30A, 30B, 30C etc; is referred to by the basic numeral value say 30, it is therefore referring to the entire class of parts with the numeral value 30, in addition to the individual subpart such as 30A. It should also be understood that when a singular part, class, object, or component is mentioned, it should be known that more than one of the part, class, object, or component is possible on a singular embodiment. This goes for any component or subcomponent mentioned herein.

It should further be understood that all parts contained within the current disclosure may come in a variety of dimensions, sizes, colors, materials, and shapes; and should not be limited in design by the current disclosure.

Figure 1:
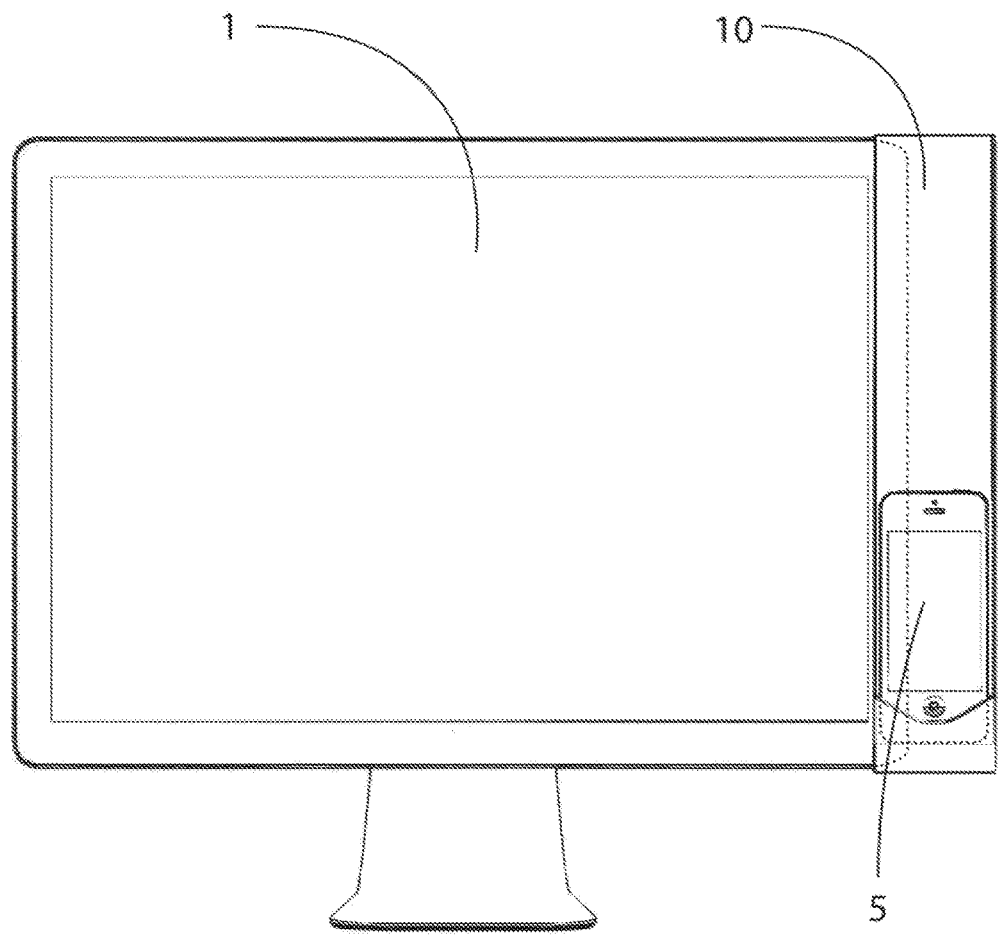
FIG. 1 illustrates a front view of a user's workstation in accordance with one exemplary embodiment of the current disclosure.

FIG. 1 illustrates a front view of a user's workstation including a monitor 1, electronic device 5, and an exemplary electronic device monitor docking apparatus 10. This particular workstation example could be in a home, office, dorm, library, internet café or any other location with a said monitor 1, where the desire to position said electronic device 5 in a prominent position exists. Overlapped portions of components are shown with a dotted line. Said monitor 1 may be any sized monitor, screen, computer screen, television, TV or other device used for displaying a dynamic visual image known to those skilled in the art. In this particular exemplary embodiment a desktop computer monitor is shown. Electronic device 5 may be any electronic handheld device including but not limited to any phone, smartphone, MP3 player, PDA, tablet, phone-tablet, mobile computer, cell phone, or other electronic device known to those skilled in the art. In this particular exemplary embodiment we are displaying a smartphone device. Said electronic device monitor docking apparatus 10 is joined to said monitor 1 in a semi-permanent state. Semi-permanent in that said electronic device monitor docking apparatus 10 would be joined to said monitor 1 in a motionless state until desired to be removed by the user. Said electronic device monitor docking apparatus 10 may be joined to any portion of said monitor 1; including but not limited to the left side, right side, top, bottom, front or back of said monitor 1.

Said electronic device monitor docking apparatus 10 may be any shape, size, dimension, material, color or configuration. However a flat-faced design of said electronic device monitor docking apparatus 10 is preferred, due to the fact that a flat-face provides room for users to customize their workspace via said electronic device monitor docking apparatus 10; including but not limited to adding a mirror, sticky-notes, family photos, buttons, stickers, magnets, pictures, clocks, speakers, and any other means of decoration known to those skilled in the art. As stated, said electronic device monitor docking apparatus 10 may also include a plurality of the following: a clock, speaker system, magnetic face, LCD panel, LED panel or other dynamic visual display means known to those skilled in the art. Said electronic device monitor docking apparatus 10 may further feature a transparent cover for which paper prints of the desktop background can be placed; helping to form what appears to be one seamless desktop background across one monitor, the said electronic device monitor docking apparatus 10 and a second monitor.

Figure 2:
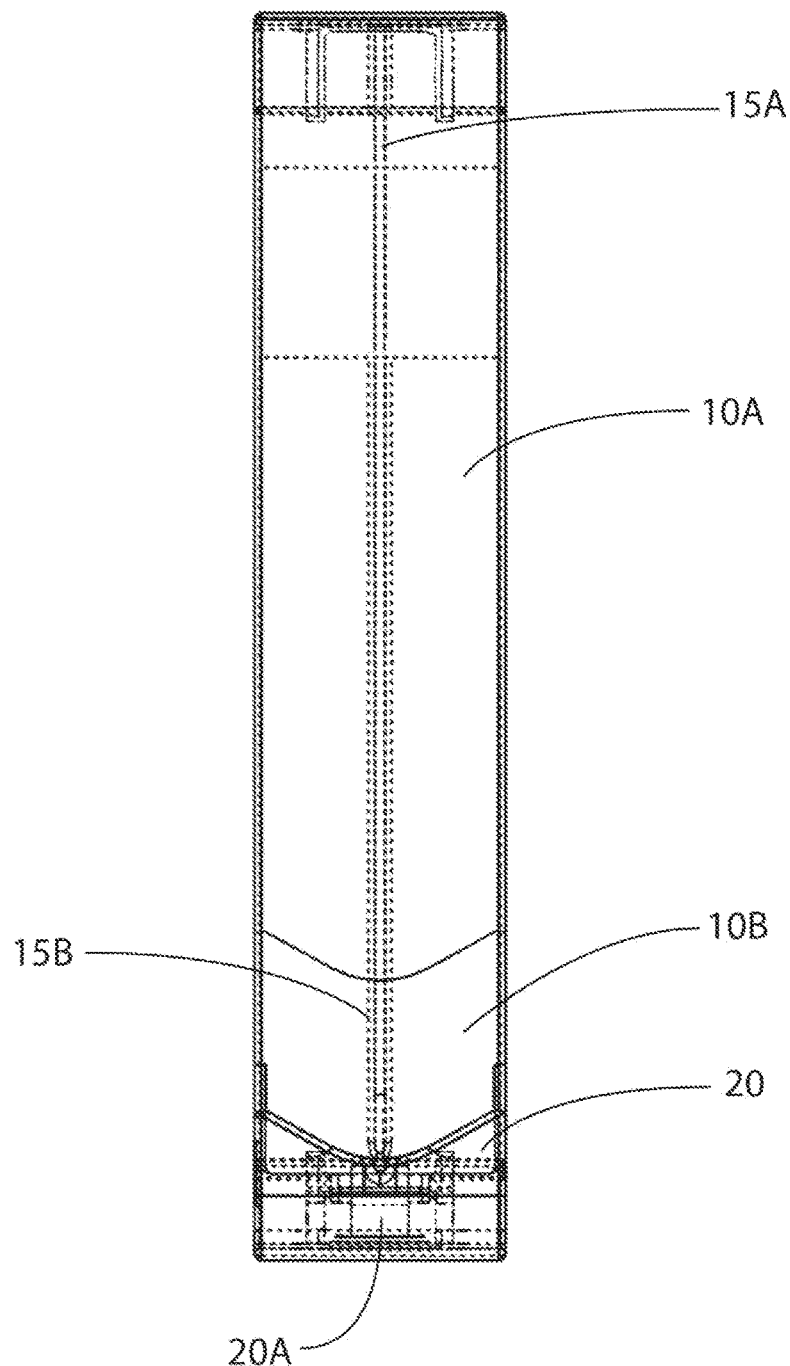
FIG. 2 illustrates a front view of an exemplary electronic device monitor docking apparatus in accordance with one exemplary embodiment of the current disclosure.

FIG. 2 illustrates a front view of the said electronic device monitor docking apparatus 10 in accordance with one exemplary embodiment of the current disclosure. Said electronic device monitor docking apparatus 10 may be constructed out of any material available or known to those skilled in the art including plastic, metal, wood, carbon fiber, glass, etc. However the preferred construction means is via an injection mold plastic process utilizing computer aided design files. Electronic device monitor docking apparatus 10 may be one solid form, however due to the fact that many different sizes of said monitor 1 exist, it is generally desirable to have said electronic device monitor docking apparatus 10 composed of two or more extendable, interconnecting portions.

The exemplary embodiment shown in FIG. 2 features two extendable interconnecting portions, an upper portion 10A and a lower portion 10B. Upper portion 10A features an upper spine 15A. Lower portion 10B features a lower spine 15B. Upper portion 10A and lower portion 10B join together via the interconnecting means of upper spine 15A and lower spine 15B. Upper portion 10A and lower portion 10B slide relative to one another to enable extension of said electronic device monitor docking apparatus 10 in order to be joined to a plurality of sizes of said monitor 1. Upper spine 15A and lower spine 15B could be any means of joining two components to enable a sliding motion known to those skilled in the art; however for this particular embodiment we propose a female coupling mechanism accepting a male coupling mechanism along a vertical axis to enable vertical extension. The concave female portion could belong to upper spine 15A or lower spine 15B, in addition, the convex male portion could belong to either upper spine 15A or lower spine 15B; however they will be mutually exclusive to allow proper coupling and sliding operation. The current embodiment shown in FIG. 2 features the concave female portion assigned to lower spine 15B, and the convex male portion assigned to upper spine 15A; however as disclosed, these can be reversed. As such, upper spine 15A inserts into lower spine 15B and is thus held in place disabling lateral motion, while enabling vertical motion. Any means known to those skilled in the art may be utilized to form tension between said upper spine 15A and said lower spine 15B, including but not limited to a screw and hole, nut and bolt, tightening mechanism, spring loaded means, clip means, interval teeth and indention means etc. We will explore one exemplary example in FIG. 3.

Further in FIG. 2, said lower portion 10B features a concave recess 20 on the anterior side of said lower portion 10B for accepting an electronic device 5. Said concave recess 20 may be placed on upper portion 10A or lower portion 10B, however it is preferred to be placed on lower portion 10B, as this location enables the best webcam interactions from said electronic device 5 shown in FIG. 1. Said concave recess 20 may include a means of variable motion along a vertical axis to allow for a variable placement of said concave recess 20 on said electronic device monitor docking apparatus 10. Said concave recess 20 may also have a means of rotation amongst a vertical and or horizontal axis to allow said electronic device 5 to rotate to face the user. Said concave recess 20 could be a ledge, extrusion or a recess or any other means of supporting said electronic device 5 shown in FIG. 1. Wire connector concave recess 20A is a feature which accepts a wire connector 40 shown in FIG. 5. Said wire connector 40 may be any wire, cord or cable used to connect to said electronic device 5 in order to transmit or receive power, data, audio, visual information or any other electronic signal known to those skilled in the art.

Figure 3:
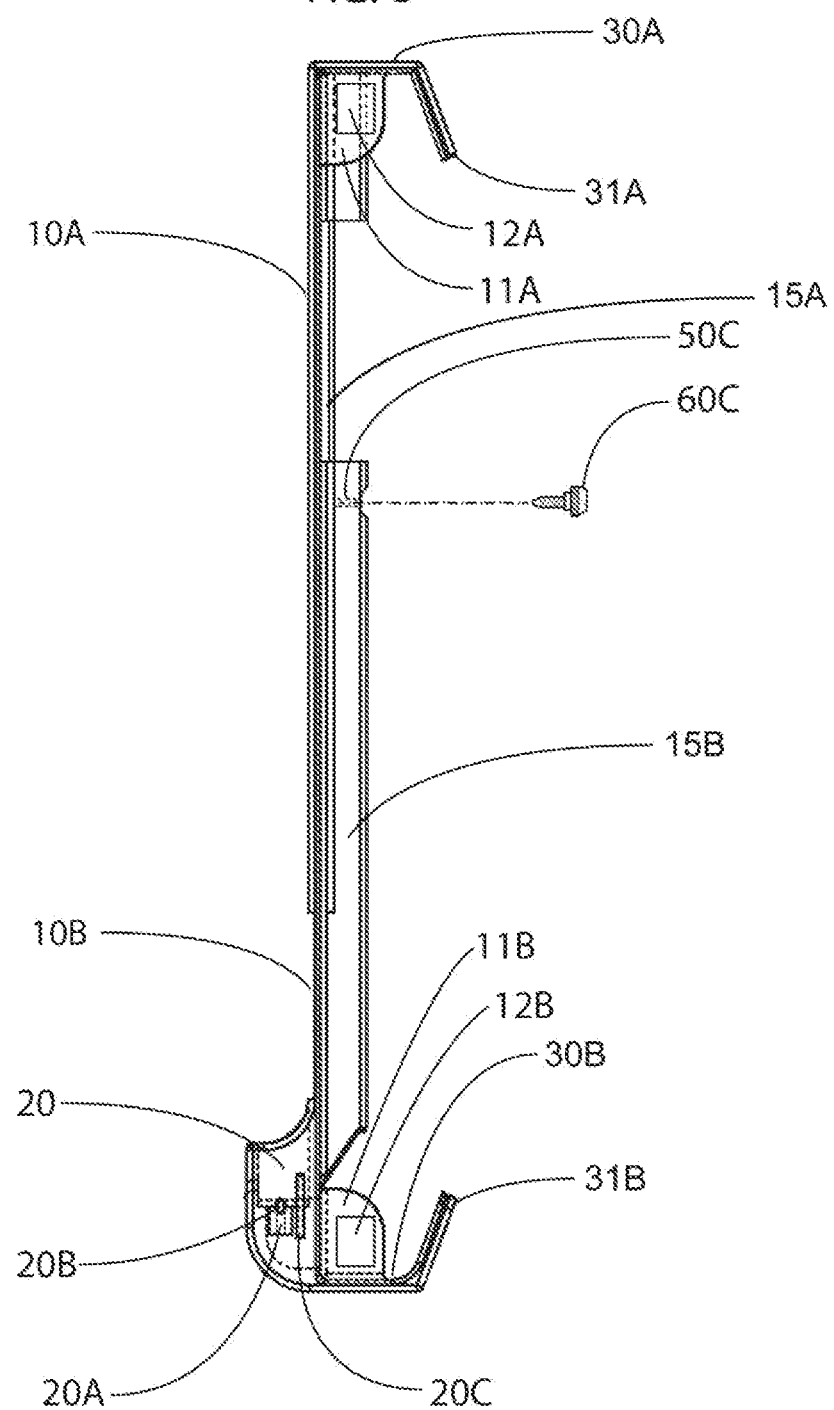
FIG. 3 illustrates a side view of the exemplary electronic device monitor docking apparatus in accordance with one exemplary embodiment of the current disclosure.

FIG. 3 illustrates a side view of the said electronic device monitor docking apparatus 10 in accordance with one exemplary embodiment of the current disclosure. Upper portion 10A and lower portion 10B are shown joined via upper spine 15A and lower spine 15B. Said lower portion 10B further includes a concave sound channel 20B which routes a hollow crevice into the interior of said concave recess 20 from both the dorsal and or ventral sides of said lower portion 10B. Said concave sound channel 20B allows sound emitted from said electronic device 5 shown in FIG. 1 to be routed to the exterior of said electronic device monitor docking apparatus 10. In addition, lower portion 10B further includes a wire channel 20C. Wire channel 20C could be any means of accepting and holding a cord which may be optionally attached to said electronic device 5 shown in FIG. 1; including but not limited to a concave hollow channel. Wire channel 20C is designed to prevent a cable such as a headphone cable from obstructing the view of images displayed on said monitor 1 shown in FIG. 1.

Further in FIG. 3, upper portion 10A further comprises a plurality of upper defined barrier fin 11A, and lower portion 10B further features a plurality of lower defined barrier fin 11B. Defined barrier fin 11 is present to prevent said electronic device monitor docking apparatus 10 from obstructing the view of dynamic visual images displayed on said monitor 1 shown in FIG. 1. A plurality of defined barrier fin 11 is positioned at any location on the posterior portion of said electronic device monitor docking apparatus 10. Defined barrier fin 11 could be positioned at any distance from the dorsal and ventral sides of the upper portion 10A and lower portion 10B, however it must be positioned at a distance slightly smaller than the perimeter bezel size of a standard said monitor 1 shown in FIG. 1. A bezel is defined as the anterior and perimeter portion which surrounds the visual display portion of a said monitor 1 shown in FIG. 1. By positioning the plurality of defined barrier fin 11 at a smaller distance than a standard bezel size of said monitor 1, prevents said electronic device monitor docking apparatus 10 from obstructing the view of dynamic visual images. There may further be a means to make this distance adjustable, including placing defined barrier fin 11 on a slider means, or defined barrier fin 11 may be attached at a variable location using any means for joining two parts known to those skilled in the art.

Further referring to FIG. 3; said electronic device monitor docking apparatus 10 further features one or more adhesive pad 12. FIG. 3 shows upper adhesive pad 12A located on upper portion 10A, and a lower adhesive pad 12B located on lower portion 10B. A plurality of said adhesive pad 12 may be placed at any location on said electronic device monitor docking apparatus 10. Said adhesive pad 12 provides an adhesive contact surface for which to join said monitor 1 shown in FIG. 1 and said electronic device monitor docking apparatus 10. Said adhesive ad 12 may further be of a cushioned variety to prevent damage to said monitor 1 shown in FIG. 1. Said adhesive pad 12 may be composed of any adhesive material known to those skilled in the art including rubber, foam, cloth, leather, plastic etc, and may have adhesive properties on any or all sides of said adhesive pad 12. Said adhesive pad 12 may feature a temporary paper cover which can be removed to reveal a sticky adhesive surface which may join said electronic device monitor docking apparatus 10 to the side, top, front, or rear of said monitor 1 shown in FIG. 1 in a semi-permanent state. A plurality of said adhesive pad 12 may also be positioned on the outer most sides and posterior surface of said electronic device monitor docking apparatus 10 to allow semi-permanent joining to the anterior perimeter bezel portion of a said monitor 1 shown in FIG. 1.

Further referring to FIG. 3; said electronic device monitor docking apparatus 10 may further feature one or more brace ledge 30. Upper brace ledge 30A is positioned on upper portion 10A and lower brace ledge 30B is positioned on lower portion 10B. Said brace ledge 30 is present to act as a brace for contact with the top, bottom and or sides of said monitor 1 shown in FIG. 1. Said brace ledge 30 may include one or more adhesive pad 12. Said brace ledge 30 may be any size or shape. Upper brace ledge 30A further features an upper brace grip 31A, and lower brace ledge 30B features lower brace grip 31B. Said upper brace grip 31A and said lower brace grip 31B couple with said brace ledge 30 among any means known to those skilled in the art, and is designed to provide additional support of said electronic device monitor docking apparatus 10. A cylindrical channel 50C may be placed on lower spine 15B which may accept a thumb screw 60C. Thumb screw 60C may be tightened, with a tool or by hand, which when tightened prevents movement of said upper portion 10A relative to lower portion 10B. Said thumb screw 60C may feature a region to be tightened by hand. All screws mentioned herein may be tightened by hand without the need of any additional tools.

Figure 4:
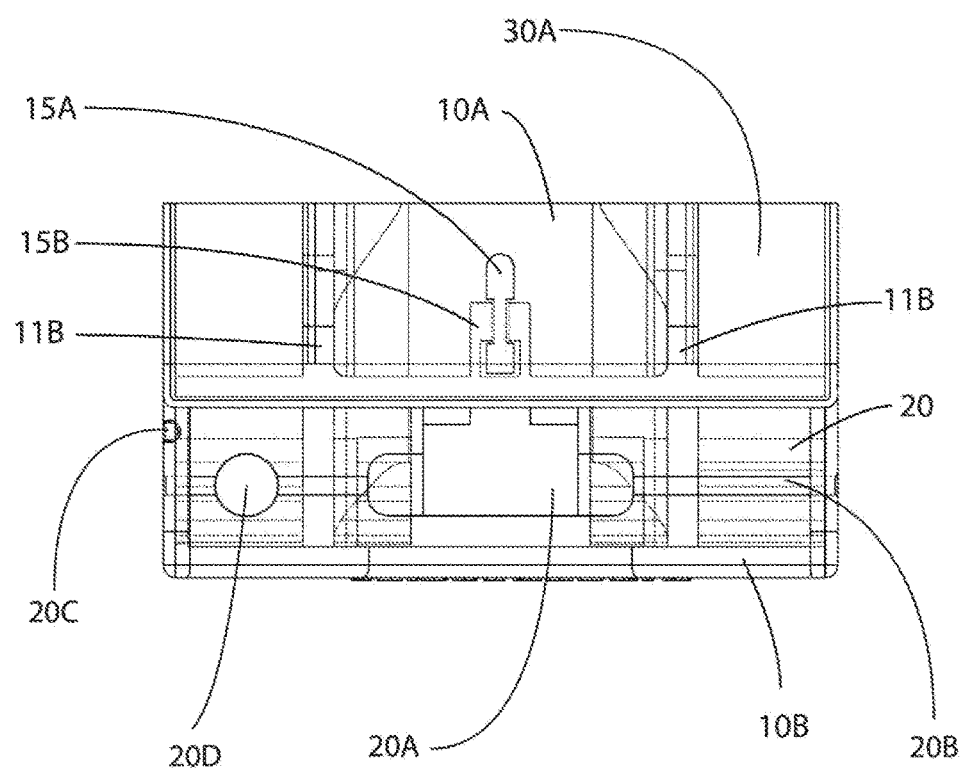
FIG. 4 illustrates a top view of the exemplary electronic device monitor docking apparatus in accordance with one exemplary embodiment of the current disclosure.

FIG. 4 illustrates a top view of the said exemplary electronic device monitor docking apparatus 10 in accordance with one exemplary embodiment of the current disclosure. Said wire channel 20C is shown positioned on the side of electronic device monitor docking apparatus 10; said wire channel 20C may be placed at any location on said electronic device monitor docking apparatus 10. Said concave sound channel 20B is shown as a linear channel within said concave recess 20. Said concave sound channel 20B may be routed to any portion of said electronic device monitor docking apparatus 10 including the bottom, top, or sides of the device. Said wire connector concave recess 20A is shown which accepts a wired connector 40 shown in FIG. 5. Said wire connector concave recess 20A may be any size or dimension, but is ideal to correspond with the size and dimension of the said wired connector 40. Said wired connector 40 shown in FIG. 5 may come in a variety of sizes, shapes and dimensions depending on the specific said electronic device 5 used. Said wire connector concave recess 20A may include a permanently embedded said wire connector 40 shown in FIG. 5 or may accept and hold a said wired connector 40 shown in FIG. 5. Said wire connector concave recess 20A may be designed to accept a plurality of sizes of wire connector 40 shown in FIG. 5.

Further in FIG. 4, said concave recess 20 further features a concave audio recess 20D which extends from the bottom of the said lower portion 10B into the interior portion of the concave cavity 20 to allow passing of an optional audio sound cable which plugs into said electronic device 5 shown in FIG. 1. Said concave audio recess 20D may be located at any location on said electronic device monitor docking apparatus 10 including the sides, bottom, front or back of said electronic device monitor docking apparatus 10. Said concave audio recess 20D may not only accept an optional audio cable, but may permanently house an audio cable for use with an alternative embodiment of the current disclosure which could feature a speaker system.

Figure 5:
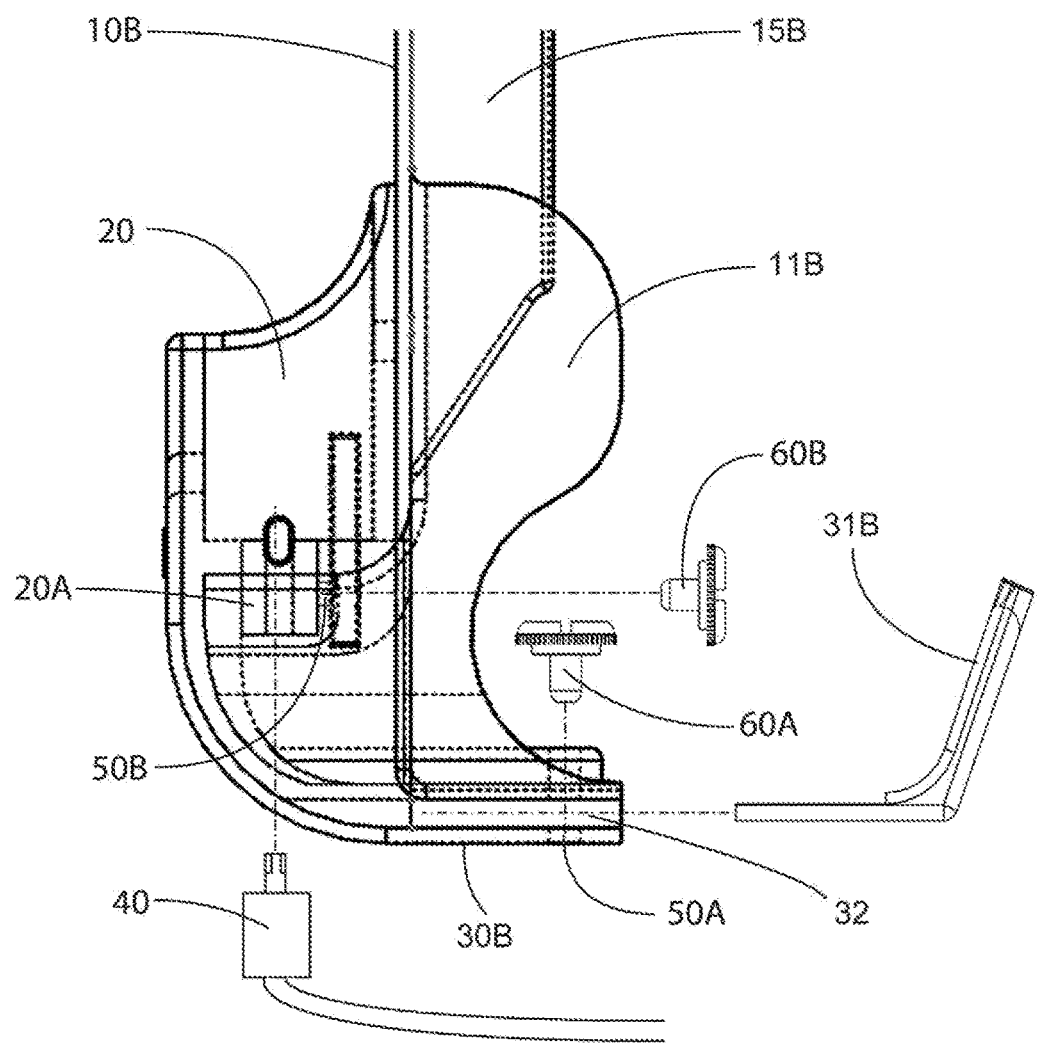
FIG. 5 illustrates an exploded and zoomed in side view of the bottom portion of the exemplary electronic device monitor docking apparatus in accordance with one exemplary embodiment of the current disclosure.

FIG. 5 illustrates a magnified side view of lower portion 10B in a secondary embodiment of the exemplary disclosure. Lower brace ledge 30B is shown with a hollow recess 32 for accepting a lower brace grip 31B. Said lower brace grip 31B is a male component which slides into the interior portion of a female brace ledge 30B via said hollow recess 32 and is adjustable in terms of its distance to the posterior face of said lower portion 10B in order to accept a varying degree of sizes of said monitor 1 depths, said monitor 1 is shown in FIG. 1. Said monitor 1 may not only come in a variety of vertical heights and horizontal widths but they also come in a varying degree of depths depending on the diagonal size of the said monitor 1 and the specific brand chosen by the user. It is desirable for said electronic device monitor docking apparatus 10 to be attachable to as many sizes of said monitor 1 as a possible. A cylindrical channel 50A accepts a screw 60A which when tightened prevents said lower brace grip 31B from moving after gripping to said monitor 1 shown in FIG. 1.

Further in FIG. 5, said cylindrical channel 50A may be used on other embodiments as a location for which to secure additional accessories such as mirrors, figurines, pen holders, or any other accessory available. Said cylindrical channel 50A may be placed at any location on said electronic device monitor docking apparatus 10. However, lower brace grip 31B may attach to lower brace ledge 30B in any means available and known to those skilled in the art including but not limited to a hinge and spring system, a clip means, a teeth and anchor means etc. In addition, it is desirable to provide a means of preventing lower brace grip 31B from completely separating from said hollow recess 32 of said lower brace ledge 30B after extension outward. This could be accomplished by any means known to those skilled in the art including but not limited to an internal clip mechanism located inside hollow recess 32.

Further in FIG. 5, a horizontal cylindrical channel 50B which routes from the posterior side of lower portion 10B into the interior portion of said wire connector concave recess 20A. A wired connector 40 is inserted into said wire connector concave recess 20A and secured via an attachment means. This attachment means is displayed as a screw 60B in this exemplary embodiment. Screw 60B is fastened into horizontal cylindrical channel 50B until it touches and grips said wired connector 40, preventing movement of said wired connector 40 in relation to wire connector concave recess 20A. Said wired connector 40 may be joined with said wire connector concave recess 20A via any means known to those skilled in the art including but limited to glue, epoxy, screw, nut and bolt, clip means, etc. Said wired connector 40 can be any power and or data cable used for transferring power or data including sound to and from the said electronic device 5 shown in FIG. 1. From here said electronic device 5, shown in FIG. 1 can be inserted into electronic device concave recess 20 where it connects to said wired connector 40 enabling a transfer of electronic power and or data and or audio. It is generally desired for the wire or cable component of said wired connector 40 to be invisible to the user by being routed through the posterior side of said lower portion 10B. In addition, there may be a means to secure the wire or cable portion of said wired connector 40 with the posterior side of said monitor 1 shown in FIG. 1 and, or said electronic device monitor docking apparatus 10.

FIG. 6 illustrates a magnified side view of the lower portion of another exemplary embodiment of the present disclosure showcasing an additional method of attaching said electronic device monitor docking apparatus 10 to said monitor 1, as shown in FIG. 1. Said electronic device monitor docking apparatus 10 may attached to said monitor 1 via any means known to those skilled in the art, we have proposed several methods in the current disclosure however these should not limit the scope of the invention. Other possible means include spring mechanisms, gripping mechanisms, tightening systems, Velcro, interval bracket means and any other means known to those skilled in the art.

In FIG. 6, one or more pivoting brace 70 is coupled about a rotational axis to said electronic device monitor docking apparatus 10, lower portion 10B shown, via one or more pivoting hinge 80B on said pivoting brace 70, and is coupled with one or more pivoting hinge 80A on said electronic device monitor docking apparatus 10. Said pivoting hinge 80A on said electronic device monitor docking apparatus 10 and said pivoting hinge 80B on said pivoting brace 70 are coupled via connector pin 90 which is inserted through a hollow recess on both said pivoting hinge 80A and said pivoting hinge 80B. Said connector pin 90 allows for a pivoting motion of said pivoting brace 70 in relation to said electronic device monitor docking apparatus 10.

Further in FIG. 6, there may be a plurality of said pivoting brace 70 coupled to said electronic device monitor docking apparatus 10 on both the right and or left sides of said electronic device monitor docking apparatus 10; but may also be placed on the top and or bottom of said electronic device monitor docking apparatus 10. The disclosed pivoting nature described allows a user to pivot the said electronic device monitor docking apparatus 10 to an appropriate angle for viewing in relation to said monitor 1 shown in FIG. 1. This can be convenient when the user is engaged in a visual video call or webcam session via said electronic device 5 shown in FIG. 1. The disclosed pivoting method is not meant to limit the scope of the disclosure as there may be many means of achieving this pivoting motion known to those skilled in the art and the present disclosure may utilize any method available.

A plurality of adhesive pad 12 may be utilized at any location on said electronic device monitor docking apparatus 10. Adhesive pad 12C and adhesive pad 12D are shown in FIG. 6, and used to join said electronic device monitor docking apparatus 10 to said monitor 1 shown in FIG. 1 in a semi-permanent state. Semi-permanent in the sense that it is permanent until the user seeks to remove the system; upon removal there is no residue left or damage done to said monitor 1 via the adhesion process.

The present disclosure may be designed to allow attachment of said pivoting brace 70 to said monitor 1 via the anterior, side, top or posterior portion of said monitor 1. The bezel anterior portion of said monitor 1 shown in FIG. 1 is the preferred location of attachment due to the fact that attaching at the anterior face of said monitor 1 allows for a greater variety of depth sizes of said monitor 1, as the depth of said monitor 1 is not of a concern with an anterior portion attachment location; allowing said electronic device monitor docking apparatus 10 to sit flush with the face of said monitor 1 despite the depth of said monitor 1 shown in FIG. 1. As the depth of said monitor 1 shown in FIG. 1 is shrinking over time with new visual display technologies. Pivoting angle limiter means 70A on said pivoting brace 70 interacts with pivoting angle limiter means 30D on said brace ledge 30B. Pivoting angle limiter means 70A and pivoting angle limiter means 30D create interval friction to allow interval style pivoting motion of said electronic device monitor docking apparatus 10 in relation to monitor 1 shown in FIG. 1. Although a consistent variable rotation may desirable, it may be convenient to have a set of predefined angles at which to rotate said electronic device monitor docking apparatus 10 in relation to said monitor 1 shown in FIG. 1. Said pivoting angle limiter 30D may be composed of a set of recessed grooves at set interval angles, and said pivoting angle limiter 70A may be a notch which when coming into contact with a groove of said pivoting angle limiter 30D causes the system to stop rotation until additional force is exerted to cause motion again until the next groove is contacted and so forth. There may be many means to creating an interval rotation and the present disclosure should not be limited to the means described herein.

Further in FIG. 6, a plurality of said adhesive pad 12 may also be placed directly on the posterior portion of said electronic device monitor docking apparatus 10 use for joining to said monitor 1 shown in FIG. 1 in a semi-permanent state. The placement location of one or more said adhesive pad 12 could also be position on an elevated and angled portion of the posterior side of said electronic docking apparatus 10 to allow for a static angle position of said electronic docking apparatus 10 in relation to said monitor 1 shown in FIG. 1. In order to provide a set angle suitable for allowing said electronic device 5 shown in FIG. 1 to face the user. Said adhesive pad 12 may also be a rubberized material to allow gripping rather than adhesion. Said adhesive pad 12 may further be composed of a cushioned adhesive material, with the ability to remove easily via a pulling motion on a non-adhesive portion of said adhesive pad 12 by the user.

It will be understood that when an element is referred to as being "secured", "connected", "coupled", "attached" or any other related term, to another element; it can be directly connected or coupled to the other element or intervening elements may be present. In contrast, when an element is referred to as being "directly secured", "directly connected", "directly coupled", "directly attached" to another element, there may be no intervening elements present. Other words used to describe the relationship between elements should be interpreted in a like fashion (e.g., "between" versus "directly between," "adjacent" versus "directly adjacent," etc.).

Certain terminology is used herein for purposes of reference only, and thus is not intended to be limiting. For example, terms such as "upper", "lower", "above", and "below" refer to directions in the drawings to which reference is made. Terms such as "front", "forward", "back", "rear", "rearward", "bottom", "side", "left", "right", "anterior", and "posterior" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order or quantity unless clearly indicated by the context.

When introducing elements or features of the present disclosure and the exemplary embodiments, the articles "a", "an", "the" and "said" are intended to mean that there are one or more of such elements or features. The terms "comprising", "including", "having" and other similar terms are intended to be inclusive and mean that there may be additional elements or features other than those specifically noted.

The present disclosure is merely exemplary in nature and, thus, variations that do not depart from the gist of the present disclosure are intended to be within the scope of the present disclosure. Such variations are not to be regarded as a departure from the spirit and scope of the present disclosure.

What is claimed is:

1. An electronic device monitor docking apparatus for joining to a monitor, the electronic device monitor docking apparatus comprising:
    a base assembly including two slideable interconnecting portions, each having a ledge, said two slideable interconnecting portions having a vertical length and axis extending from an upper edge of a monitor to a lower edge of said monitor, the base assembly further having a housing for an electronic device; and
    one or more features used to mount said two slideable interconnecting portions directly to a side portion of said monitor while said upper edge and said lower edge of said monitor are attached to said two slideable interconnecting portions such that said electronic device, when housed within the housing, is positionable at least partially in front of a viewing side of said monitor.

2. The electronic device monitor docking apparatus of claim 1, wherein the base assembly and the one or more features are attachable to various monitors having different sizes.

3. The electronic device monitor docking apparatus of claim 1, wherein the apparatus is extendable along the vertical axis by sliding one interconnecting portion within the other interconnecting portion.

4. The electronic device monitor docking apparatus of claim 1, wherein the apparatus is extendable along a horizontal axis to join a side of said monitor.

5. The electronic device monitor docking apparatus of claim 1, comprising an anterior face, said anterior face adapted to accept a speaker system for creating sound.

6. The electronic device monitor docking apparatus of claim 1, comprising a ledge which adapted to house a wire and connector, said wire and connector joining temporarily to said electronic device to exchange power and or data.

7. The electronic device monitor docking apparatus of claim 6, wherein said wire and connector comprises any wire or cable connector device used for connecting to said electronic device including electronic power cables, sound transmitting headphone cords or data transmission cables.

8. The electronic device monitor docking apparatus of claim 1, wherein said electronic device comprises any technological apparatus used for processing and/or transmission of electrical signals and/or data and/or information, including a phone, a smartphone, a cellphone, a PDA, a tablet computer, a computer, or a music player.

9. The electronic device monitor docking apparatus of claim 1, comprising a concave cavity with at least one orifice extending from an internal portion of said electronic device monitor docking apparatus to an external portion of electronic device monitor docking apparatus, located where said electronic device couples or rests on electronic device monitor docking apparatus serving to route sound outward away from said electronic device.

10. The electronic device monitor docking apparatus of claim 6, comprising means to temporarily grasp said wire and connector to prevent it from obstructing the view of said monitor.

11. The electronic device monitor docking apparatus of claim 1, comprising one or more adhesive pads.

12. The electronic device monitor docking apparatus of claim 11, wherein said adhesive pad joins or adheres said electronic device monitor docking apparatus to said monitor in a semi-permanent state.

13. The electronic device monitor docking apparatus of claim 11, comprising a temporary gripping material which temporarily joins or adheres said electronic device monitor docking apparatus to said monitor.

14. The electronic device monitor docking apparatus of claim 1, comprising one or more coupling mechanism serving to temporarily join said electronic device monitor docking apparatus to said monitor.

15. The electronic device monitor docking apparatus of claim 14, wherein said coupling mechanism comprises a pliable gripping material serving to cushion the connection between said electronic device monitor docking apparatus to said monitor.

16. The electronic device monitor docking apparatus of claim 1, comprising an anterior face, said anterior face adapted to accept a clock.

17. The electronic device monitor docking apparatus of claim 1, comprising an anterior face, said anterior face adapted to accept a mirror.

* * * * *